US 8,799,504 B2

(12) United States Patent
Capone et al.

(10) Patent No.: US 8,799,504 B2
(45) Date of Patent: Aug. 5, 2014

(54) SYSTEM AND METHOD OF TCP TUNNELING

(75) Inventors: Jeffrey M. Capone, Menlo Park, CA (US); Pramod Immaneni, Santa Clara, CA (US)

(73) Assignee: NETGEAR, Inc., San Jose, CA (US)

( * ) Notice: Subject to any disclaimer, the term of this patent is extended or adjusted under 35 U.S.C. 154(b) by 976 days.

(21) Appl. No.: 12/829,779

(22) Filed: Jul. 2, 2010

(65) Prior Publication Data

US 2012/0005369 A1    Jan. 5, 2012

(51) Int. Cl.
*G06F 15/16*    (2006.01)
*H04L 29/06*    (2006.01)

(52) U.S. Cl.
CPC .............. *H04L 29/06* (2013.01); *H04L 29/0653* (2013.01)
USPC .......................................... 709/236; 709/230

(58) Field of Classification Search
CPC ............................ H04L 29/0653; H04L 29/06
USPC ................................................. 709/236, 230
See application file for complete search history.

(56) References Cited

U.S. PATENT DOCUMENTS

2005/0063307 A1*    3/2005    Samuels et al. ............... 370/235

OTHER PUBLICATIONS

Neoaccel, Inc.; Overcoming the Performance Limitations of Conventional SSL VPN; Apr. 26, 2006.
Configuring TCP and UDP Services; The Santa Cruz Operation, Inc.; UnixWare 7 Release 7.1.1; Nov. 5, 1999.
Why TCP Over TCP is a Bad Idea; Titz, Olaf; Apr. 23, 2001.

* cited by examiner

*Primary Examiner* — Dustin Nguyen
*Assistant Examiner* — Joel Mesa
(74) *Attorney, Agent, or Firm* — Boyle Fredrickson, S.C.

(57) ABSTRACT

Tunneling is a mechanism used to aggregate payloads from a network protocol at or below the tunneling layer into a single packet. A user-space application establishes a Transmission Control Protocol (TCP) tunnel and encapsulates an end-to-end TCP payload into a TCP segment for transmission over a TCP connection. This enhanced TCP tunnel eliminates TCP meltdown and can be used over any network which supports TCP. The calling application either identifies the parameters of an existing TCP socket or establishes a new TCP socket. A modified transport layer uses the identified TCP connection in forming the enhanced TCP tunnel. The enhanced TCP tunnel manages the data transmission on the TCP stack to eliminate TCP meltdown.

18 Claims, 6 Drawing Sheets

SYSTEM AND METHOD OF TCP TUNNELING

FIELD OF THE INVENTION

The subject matter disclosed herein relates generally to Transmission Control Protocol (TCP) tunneling and, in particular, to a system for and method of encapsulating a TCP segment for communication over a TCP connection.

BACKGROUND OF THE INVENTION

Tunneling is a technique used in computer networks to aggregate and encapsulate a first network protocol inside a second network protocol of a protocol stack, sometimes referred to as a communications stack. Protocol tunnels are commonly used to deliver other protocols across non-compatible networks, bypass firewalls, improve security, or improve fairness in bandwidth consumption. The first network protocol is typically referred to as the "payload protocol." The payload protocol executes at or below the same layer of the protocol stack as the tunnel protocol. The second network protocol is typically referred to as the "delivery protocol", the "tunnel protocol", or simply the "tunnel". The payload protocol typically contains a packet generated by a higher layer protocol and passed down the protocol stack. The higher layer protocol is referred to as the "end-to-end protocol."

A well-known model for describing the protocol stack is the Open Systems Interconnection (OSI) model 50, shown in FIG. 2. The OSI model divides the stack into seven layers: physical layer 52, data link layer 54, network layer 56, transport layer 58, session layer 60, presentation layer 62, and application layer 64. When a device wishes to communicate using the OSI model 50, data 66 from one of the higher layers is passed down through each of the subsequently lower layers. At each of the lower layers, a protocol executing on that layer acts on the data from the next higher layer and passes the data to the next lower level. For example, data 66 from one of the higher levels may be passed to the transport layer 58. The Transmission Control Protocol (TCP) executing on the transport layer adds a header 80 (see FIG. 3) and passes a segment 68 to the network layer 56. The Internet Protocol (IP) executing on the network layer 56 adds another header and passes a packet 70 to the data link layer 54. A protocol executing on the data link layer 54 encapsulates the packet 70 into a frame 72 and passes the frame 72 to the physical layer 52. Finally, the physical layer 52 converts the frame 72 into a bit stream 74 for transmission over a network to another device. When the bit stream is received by the other device or "receiving device", the data is passed back up through the protocol stack of the receiving device, and each layer strips the header corresponding to that layer, which was added by the sending device, and presents the data 66 to an application executing on the receiving device. It should be noted that, although examples used herein will refer to the OSI model, use of the OSI model and references to specific protocols are not intended to be limiting. It is understood that the present invention may operate using other models of the protocol stack, such as the TCP/IP model, and other protocols executing on each layer.

A TCP tunnel is used to encapsulate and aggregate the output from an end-to-end protocol from a layer at or below the transport layer 58 into a single TCP segment. The TCP tunnel is created by initializing a first TCP socket using an internet socket application programming interface (API). A TCP socket is one of the endpoints for TCP communication and includes a local IP address and port number. The socket API then initializes a TCP connection with another endpoint that has already created a TCP server socket and bound the TCP server socket to a port. Once the TCP connection between the two sockets is established, data can be read from and written to the TCP socket using the socket API. The output from an end-to-end protocol is provided as the data 66, or payload, to the tunneling application. The payload is then encapsulated within a TCP segment and transmitted over the TCP connection. For example, a user datagram protocol (UDP) datagram may be provided as the payload to the tunneling application and encapsulated within a TCP segment because UDP and TCP are both protocols that execute on the transport layer 58 in the OSI model 50. The tunneling application may then send the TCP segment, in which the UDP datagram is encapsulated, over the TCP connection. Traffic over the TCP connection is managed, at least in part, by the TCP protocol executing on the transport layer 58.

The TCP protocol was designed for reliable and ordered delivery of communications. In order to help prevent lost communications, the TCP socket receiving data, or TCP receiver, establishes a receive window, or buffer, in which incoming data is stored. The TCP receiver uses a flow control protocol to adjust the receive window in order to efficiently handle data reception. The TCP socket sending data, or TCP sender, executes a congestion control algorithm. The congestion control algorithm establishes a maximum number of packets that can be sent without receiving an acknowledgement of receiving the packet from the other TCP socket in order to control the rate at which data enters the network. The TCP protocol additionally utilizes error detection and correction techniques to detect, for example, lost or duplicate segments and to retransmit lost segments or discard duplicate segments.

However, if a TCP tunnel is carrying another TCP segment, known as TCP-over-TCP, a problem commonly known as "TCP meltdown" may occur. TCP meltdown typically occurs when the congestion control and error correction algorithms of both the TCP tunnel protocol and the TCP end-to-end protocol attempt to correct errors in transmission. Each TCP protocol may attempt to correct errors at a different rate, and both TCP protocols may attempt to resend lost packets. The competing error correction algorithms may overwhelm the network bandwidth, hence reducing transmission rates and increasing traffic with retransmitted segments. If, for example, a lost segment is detected by the tunnel TCP protocol, the tunnel TCP protocol will attempt to retransmit the lost segment. However, the TCP payload encapsulated within the tunnel TCP segment is necessarily lost as well. Consequently, the end-to-end protocol, which first generated the TCP payload, will also attempt to retransmit the lost TCP payload, generating additional traffic.

A TCP tunnel can also increase the round-trip time (RTT) of an end-to-end TCP stream by approximately four times, which causes a decrease in the throughput of a TCP flow by as much as 60%. For example, sample data sent from the TCP sender of the end-to-end TCP connection generates a first segment which gets encapsulated as the payload of the second segment generated by the TCP sender of the TCP tunnel. The second segment generated by the TCP tunnel is first acknowledged (ACK) by the TCP receiver of the TCP tunnel, and the TCP receiver of the TCP tunnel extracts the payload from the second segment. The payload extracted from the second TCP segment is then processed by the TCP receiver of the end-to-end TCP connection, which will generate a second acknowledgement (ACK). The second acknowledgement must be returned to the TCP sender of the end-to-end TCP connection. The TCP receiver of the end-to-end TCP connection now acts as a sender and encapsulates the ACK as data in a return payload. The TCP receiver of the TCP tunnel now also acts as a sender and generates another TCP segment to return the encapsulated ACK to the original TCP sender of the TCP tunnel. This return segment must also be acknowledged by the TCP sender of the TCP tunnel and the payload extracted therefrom. The encapsulated acknowledgment is finally returned to the original TCP sender of the end-to-end TCP connection. As demonstrated, two acknowledgments are required for each end-to-end TCP segment. The requirement for two acknowledgements both reduces bandwidth and increases the RTT for the TCP tunnel.

Attempts to solve the TCP meltdown and increased RTT problems have not been met without drawbacks. Presently, TCP segments are carried by tunnels created using other protocols, such as UDP, interne protocol security (IPsec), or generic route encapsulation (GRE). However, many networks do not support these protocols and require that the tunnel also be created by TCP protocol.

Other solutions have proposed modifications to the TCP layer, for example by using selective acknowledgements (SACKs) and explicit congestion notification (ECN) bits of the TCP header. However, such modifications require that both endpoints of the TCP connection support the modified TCP layer, limiting the usefulness of the solution to TCP connections established between endpoints having the modifications.

Therefore, it would be desirable to provide a method of TCP tunneling that supports TCP-over-TCP tunneling that may be implemented on a single end of the TCP connection.

SUMMARY OF THE INVENTION

In accordance with a first aspect of the invention, the above-referenced and other needs are met by providing an enhanced transport layer executing on the TCP sender. A user-space application establishes a Transmission Control Protocol (TCP) tunnel and encapsulates an end-to-end TCP payload into a TCP segment for transmission over a TCP connection. This enhanced TCP tunnel eliminates TCP meltdown and can be used over any network which supports TCP. The calling application either identifies the parameters of an existing TCP socket or establishes a new TCP socket. A modified transport layer uses the identified TCP connection in forming the enhanced TCP tunnel. The enhanced TCP tunnel manages the data transmission on the TCP stack to eliminate TCP meltdown.

According to one embodiment of the present invention, a TCP tunnel for transmitting data between a computer and a network includes an interface receiving a payload from a calling application, a packet capture module receiving data from a TCP stack on the computer, and a modified transport layer. The modified transport layer is executable to receive the payload from the interface, encapsulate the payload as a TCP segment, and insert the TCP segment into a TCP stack on the computer. The modified transport layer is also executable to receive the data from the TCP stack, identify a TCP segment encapsulated in the data, and selectively transmit the data to the calling application. If a TCP segment is encapsulated in the data, the modified transport layer transmits the data to the calling application. If no TCP segment is encapsulated in the data, the modified transport layer transmits the data to a standard transport layer. The modified transport layer also periodically passes a stay-alive segment to a standard transport layer.

As another aspect of the invention, the interface may identify an address and a port number corresponding to an existing TCP socket on the computer and passes the address and the port number to the modified transport layer. The interface may also generate a test message, pass the test message to the TCP socket, and read a sequence number and an acknowledgement number from a return message captured from the TCP socket. Optionally, the interface may establish a TCP connection, store an address and a port number corresponding to the TCP connection, and pass the address and the port number to the modified transport layer.

As yet another aspect of the invention, the modified transport layer may selectively bypass the transport layer and interface directly with the network layer. The modified transport layer may also insert the TCP segment into any layer of the TCP stack below the transport layer.

As still another aspect of the invention, the modified transport layer may extract a first TCP sequence number and a first TCP acknowledgment number of an established TCP connection, and computes a second TCP sequence number and a second TCP acknowledgment number corresponding to the first TCP sequence number and the first TCP acknowledgment number respectively.

According to another embodiment of the present invention, a method of transmitting data between a computer and a network using a Transmission Control Protocol (TCP) tunnel obtains connection parameters for a TCP Socket and initializes a modified transport layer using the connection parameters. The connection parameters may include the source IP address, the destination IP address, the source port number, and the destination port number. The method obtains a sequence number and an acknowledgement number for a TCP connection using the TCP socket and accepts an incoming payload from a calling application. A TCP segment is constructed in the modified transport layer using the sequence number and the acknowledgment number for the established TCP connection and inserted at or below a transport layer of the TCP socket. The modified transport layer may also receive data from the TCP socket and return selected data to a calling application. The sequence and acknowledgement numbers are read from the data, and a next sequence and acknowledgment number are computed corresponding to the sequence and acknowledgment number. The TCP tunnel may obtain an initial sequence and acknowledgement number for the TCP connection by probing the established TCP connection. As another aspect of the invention, probing the established TCP connection may include creating a test segment, sending the test segment on the TCP connection, capturing a return segment from the TCP connection, and reading the sequence number and the acknowledgement number from the return segment. Optionally, the TCP tunnel may establish a TCP connection, and the IP address, the destination IP address, the source port number, and the destination port number may be stored while establishing the TCP connection.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
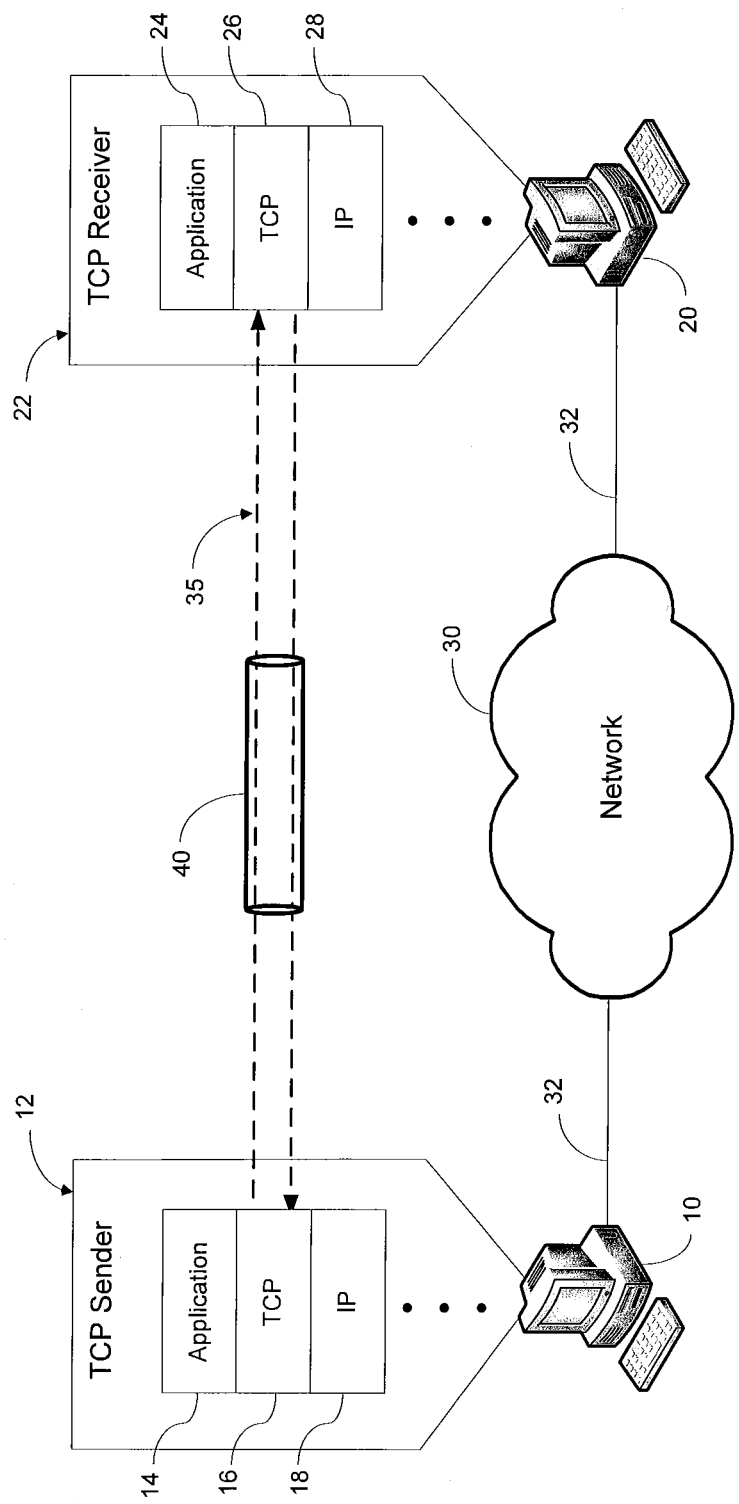
FIG. 1 is a block diagram representation of an exemplary environment incorporating one embodiment of the present invention.
Figure 2:
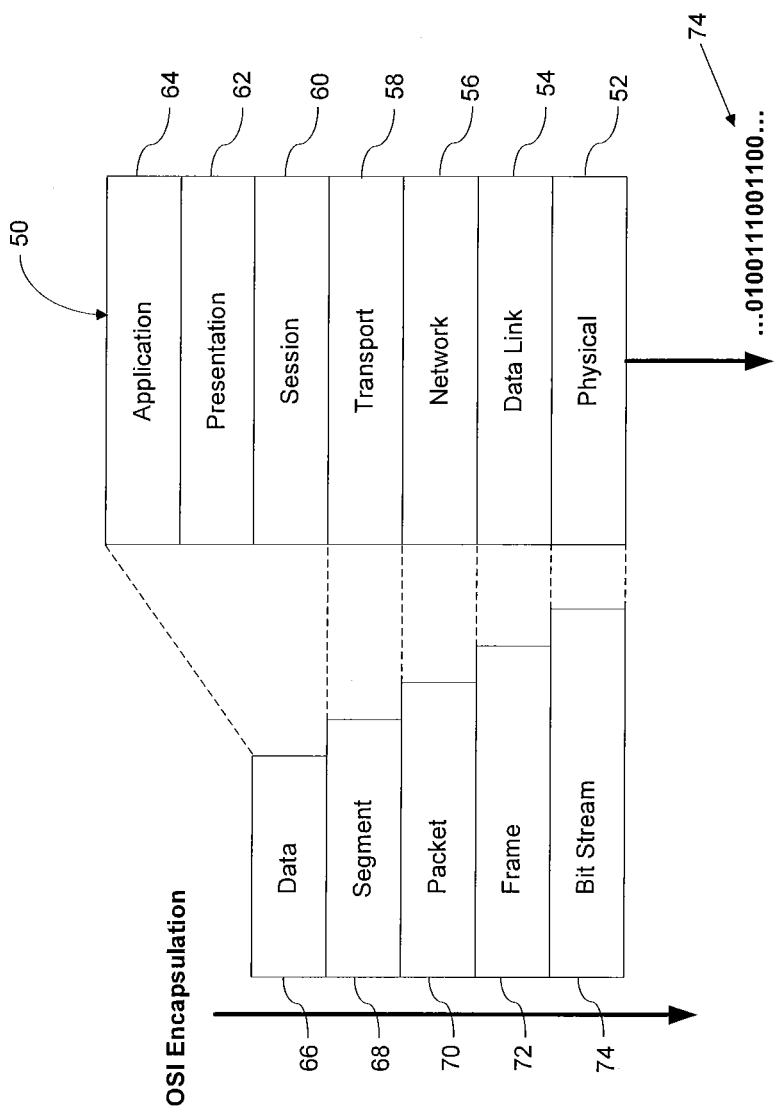
FIG. 2 is a block diagram illustrating the OSI model of a protocol stack and is appropriately labeled "Prior Art"
Figure 3:
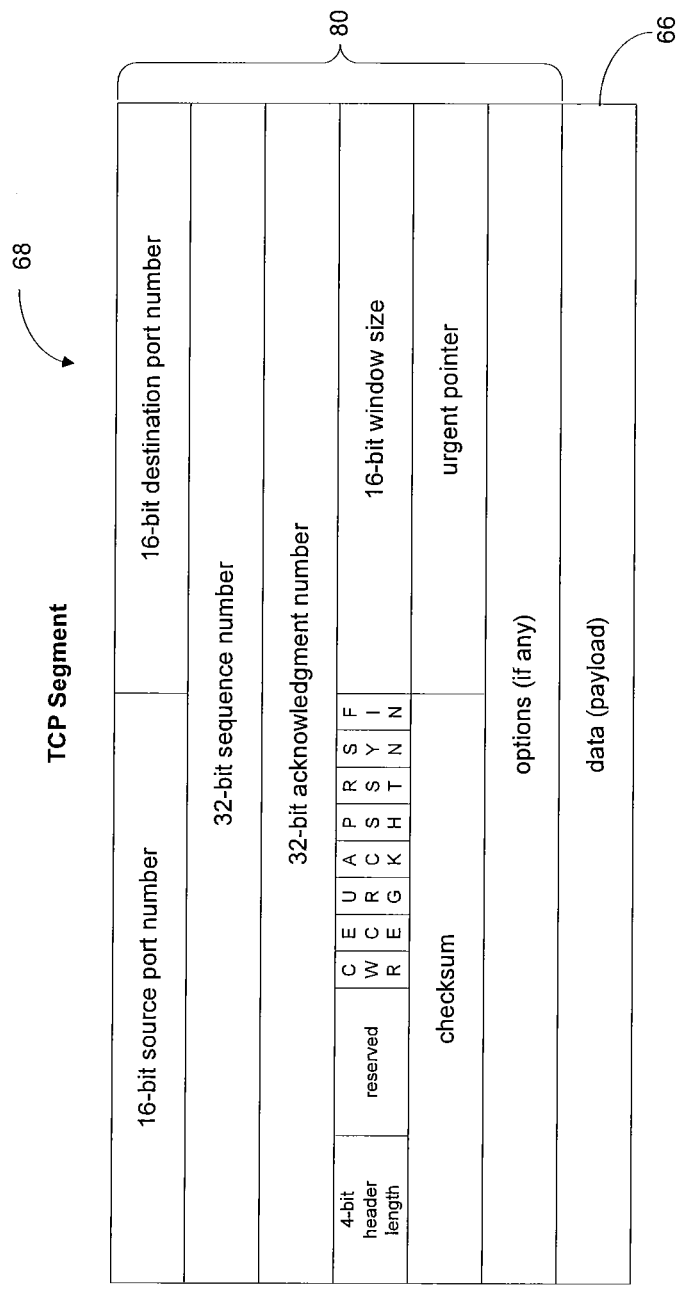
FIG. 3 is a block diagram representation of a TCP segment and is appropriately labeled "Prior Art"

Referring to FIG. 1, an exemplary environment incorporating the present invention is disclosed. First and second computers 10 and 20 are connected to a network 30, such as the Internet, by network connections 32. The network connection 32 may include, but is not limited to, network cables, switches, routers, gateways, or other devices as would be known in the art. Each computer may comprise any network-enabled device including a processor and network interface, including, but not limited to a desktop or laptop computer, network server, or network-enabled mobile phone, personal digital assistant (PDA) or gaming console. Each of the first and second computers, 10 and 20 respectively, includes a processor which executes an operating system that manages a network protocol stack. Preferably, each operating system is configured to communicate via a Transmission Control Protocol (TCP) stack. Either of the first or second computers, 10 and 20 respectively, may establish a TCP connection 35 with the other computer. As illustrated by the dashed lines, a TCP connection 35 appears as a virtual connection between the TCP protocol 16 executing on the first computer 10 and the TCP protocol 26 executing on a second computer 20.

In the example of FIG. 1, the first computer 10 acts as the sender, establishing a first TCP stack 12, and the second computer 20 acts as the receiver, establishing a second TCP stack 22. The first computer 10 may use the TCP connection 35 to establish a TCP tunnel 40 between the first and second computers, 10 and 20 respectively. An application 14 executing on the first computer 10 generates data which is passed to the TCP protocol 16. The data is encapsulated in a TCP segment and passed to the Internet Protocol (IP) protocol 18. The operating system managing the TCP sender stack 12 continues to pass the data down through subsequent layers and transmits the data to the physical network connection 32, for example via a network interface card. The second computer 20 receives the data from its physical network connection 32, for example via a second network interface card. The operating system managing the TCP receiver stack 22 passes the data up to the IP protocol 28 which, in turn, extracts the TCP segment and passes it to the TCP protocol 26 on the second computer 20. The TCP protocol 26 extracts the data and passes it to the application 24 executing on the second computer 20. The application 24 may similarly return a message to the first computer 10 by passing data down the TCP receiver stack 22, across the network 30, and back up the TCP sender stack 12.

Figure 4:
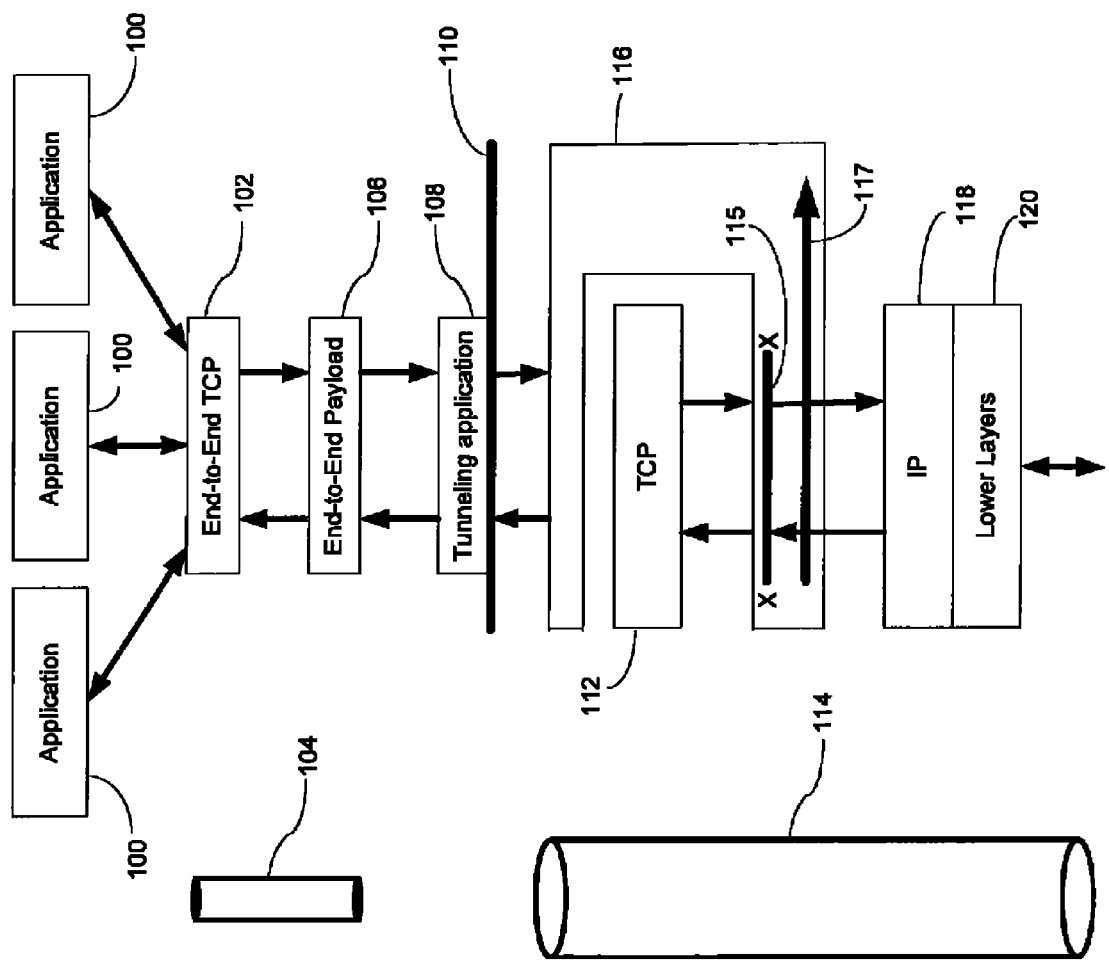
FIG. 4 is a block diagram representation of one embodiment of the present invention.

Referring next to FIG. 4, the TCP tunnel 40 (shown in FIG. 1) may be used for TCP-over-TCP communications, that is, a first TCP segment is encapsulated in a second TCP segment. An application 100 generates data to be transmitted via an end-to-end TCP connection 102. The data passes through a first TCP stack 104, resulting in an end-to-end payload 106 which includes a TCP segment. The end-to-end payload 106 may be captured from any layer of the end-to-end segment and, therefore, may be a segment from a TCP protocol, a packet from a network protocol, or a frame from an Ethernet protocol. A tunneling application 108 calls interface 110 to communicate with a modified transport layer 116. Preferably, the modified transport layer 116 executes in user space and operates in parallel with a standard transport layer 112 executing on the second TCP stack 114. The tunneling application 108, interface 110, and modified transport layer 116 may execute as separate programs, a single program, or a combination thereof. The structure of the programs may depend, for example, on the operating system, the network, the calling application, the processor on the computer, or a combination thereof. Preferably, each of the tunneling application 108, interface 110, and modified transport layer 116 executes in "user space", such that the "kernel space" of the computer on which they are executing need not be modified. User space is memory allocated to applications executing outside of the operating system. Kernel space is memory allocated to applications executing within the operating system such as device drivers and other system applications. Optionally, a portion or all of the tunneling application 108, interface 110, and modified transport layer 116, may be incorporated into the kernel space of the computer on which they are executing.

If a TCP connection has already been established, the tunneling application 108 may identify the TCP socket on the computer and pass the TCP socket to the interface 110. The interface 110 may be, but is not limited to, an application programming interface (API) executing on the computer. The interface 110 may define multiple routines, such as routines to establish the modified transport layer 116, pass the TCP socket to the modified transport layer 116, send a payload from the tunneling application 108 to the modified transport layer 116, and return data from the modified transport layer 116 to the tunneling application 108. Optionally, the interface 110 may also include a routine to open a new TCP socket. Having received the TCP socket, the modified transport layer 116 extracts the connection parameters of the TCP socket. The connection parameters may include the source IP address, destination IP address, source port number, and destination port number. The modified transport layer 116 assigns an identifier via the interface 110 for use by the tunneling application 108 for subsequent reads and writes over the TCP connection. Optionally, the tunneling application 108 may be used to establish a TCP connection between the computer on which it is executing and a receiving computer. While the TCP connection is being established, the tunneling application 108 may capture and store each of the IP address, destination IP address, source port number, and destination port number, as well as a current sequence number and acknowledgement number of the TCP socket being created for subsequent transmission to the modified transport layer 116.

The modified transport layer 116 interfaces with a second TCP stack 114 to manage data transfer between the tunneling application 108 and the network 30. End-to-end payloads 106 sent out by the tunneling application 108 are passed directly to the modified transport layer 116 via the interface 110 using the identifier previously assigned by the modified transport layer 116. The modified transport layer 116 encapsulates the end-to-end payload and injects it into any layer of the TCP stack 114 at or below the network layer. For example, the modified transport layer 116 may encapsulate the end-to-end payload 106 as a TCP segment and inject the TCP segment into the network layer 118 of the TCP stack 114. Optionally, the modified transport layer 116 may further add an IP and/or an Ethernet header and inject the resulting packet or frame into a lower layer 120 of the TCP stack 114.

The modified transport layer preferably also includes a firewall 115 and a packet capture module 117 to manage data transfer from the network 30 to the tunneling application 108. The packet capture module 117 may capture data from any layer of the TCP stack 114 below the transport layer. For example, the packet capture a frame or a packet from the data link layer or the network layer, respectively, and the TCP segment extracted therefrom. The modified transport layer 116 examines captured segments and determines whether to pass each segment up through the second TCP stack 114 using either the standard transport layer 112 or the modified transport layer 116. The firewall 115 is a routine executable by the computer to selectively block or transmit segments from the network layer 118 or from lower layers 120 to the transport layer according to a first pre-defined filter. The firewall 115 similarly may selectively block or transmit segments from the transport layer to the network layer 118 or lower layers 120 according to a second pre-defined filter. The first and second pre-defined filters may be configured to selectively block or transmit either the same or a different set of segments between layers. The packet capture module 117 is a routine that is able to read packets matching a pre-defined filter, including, but not limited to, a TCP port, IP address, or TCP header bits, from the transport layer, 112 or 116, network layer 118, or a lower layer 120 of the second TCP stack 114.

Figure 5:
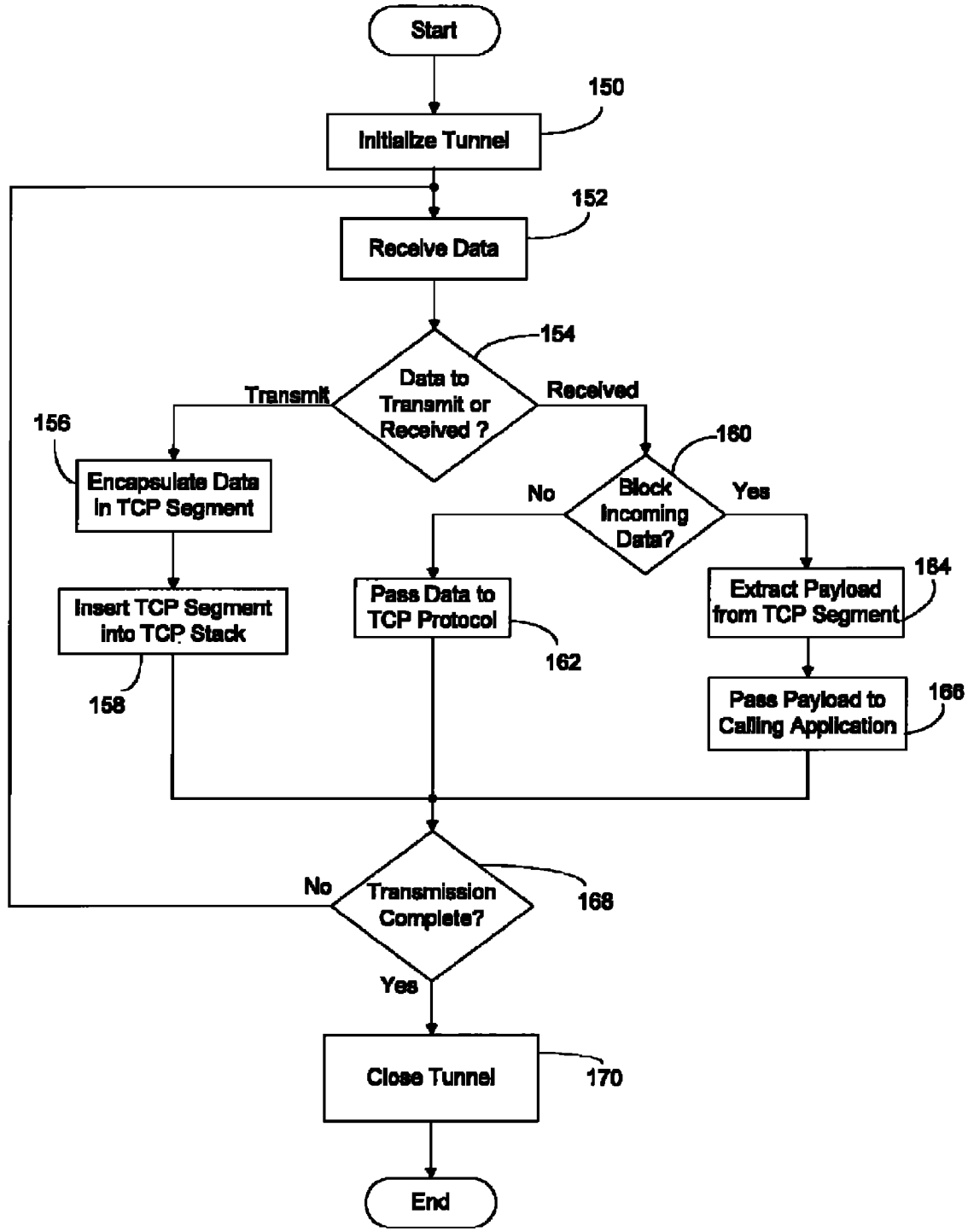
FIG. 5 is a flow chart illustrating the operation of a TCP tunnel implemented by the embodiment of the present invention illustrated in FIG. 4.
Figure 6:
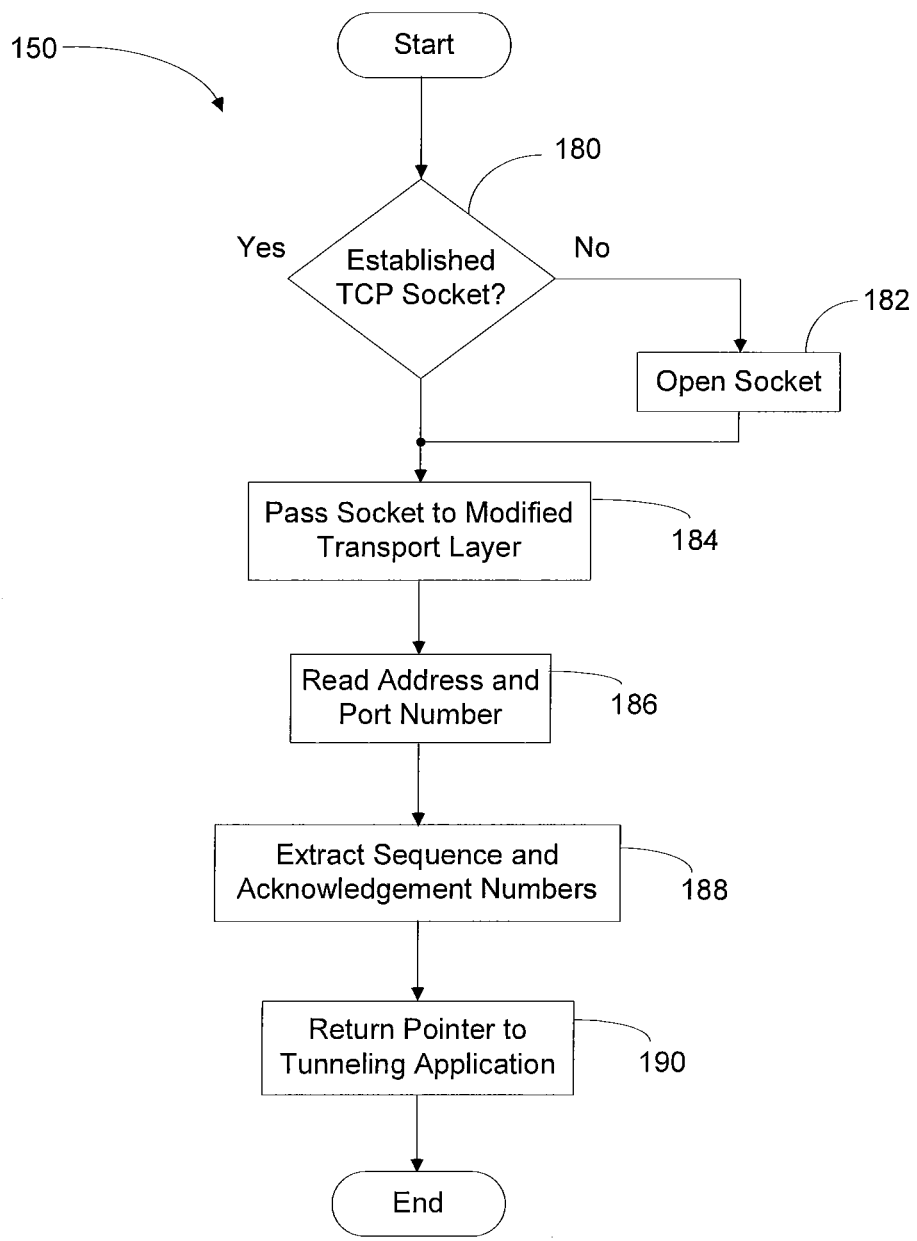
FIG. 6 is a flow chart illustrating initialization of the TCP tunnel.

Referring also to FIGS. 5 and 6, operation of a TCP tunnel 40 according to one embodiment of the present invention is illustrated. The TCP tunnel 40 is initialized at step 150. As shown at step 180 in FIG. 6, the tunneling application 108 first determines whether a TCP socket is established. If the TCP socket exists, the tunnel initialization may proceed according to steps 184-190. If no TCP socket has been opened, the tunneling application will first open a TCP socket, as shown in step 182. At step 184, the tunneling application 108 uses interface 110 to pass the socket to the modified transport layer 116. The modified transport layer 116 obtains the socket parameters, such as the source IP address, destination IP address, source port, and destination port from the established TCP socket at step 186. At step 188, the modified transport layer 116 transmits a test message to the established TCP socket and records the sequence and acknowledgement numbers from the header of the returned TCP segment. Optionally, the modified transport layer 116 may be configured to monitor establishment of the TCP socket. The TCP segments used to establish the TCP socket and subsequent TCP connection may be captured and the socket parameters, including the source IP address, destination IP address, source port, destination port, sequence number, and acknowledgment number may be stored for subsequent use by the modified transport layer 116.

Using the socket parameters, the modified transport layer 116 may dynamically set filters for the firewall 115 that block packets from reaching the TCP layer. For example, the firewall 115 may be configured to block packets from the established TCP connection that contain TCP segments with either the PSH-ACK or PSH bit set. The firewall 115 may permit other segments, for example, those containing TCP segments with other control bits set to enter the TCP layer. The firewall 115 may allow a portion of the segments to pass to the standard transport layer 112 as stay-alive segments. The stay-alive segments are processed by the standard transport layer to maintain the established TCP connection in the operating system and to close the connection when communications are complete. Optionally, the modified transport layer 116 may generate stay-alive segments and pass them to the standard transport layer 112. When the TCP connection is closed, the modified transport layer 116 may clear the filters for the firewall 115 such that subsequent network traffic is not affected.

Referring again to FIG. 5, once the tunnel is initialized, the modified transport layer 116 waits until it receives data at step 152. The data may be received either from the tunneling application 108 or from a lower layer 120 of the TCP stack 114. At step 154, the modified transport layer 116 handles the data according to whether 1) it was received from the tunneling application 108 and needs to be transmitted to the network layer 118 or a lower layer 120 in the TCP stack 114 or 2) it was received from the network layer 118 or a lower layer 120 in the TCP stack 114 and needs to be sent to the tunneling application 108. If the data received at step 154 was a payload 106 from the tunneling application 108 and needs to be transmitted, the payload 106 is encapsulated as data in a new TCP segment at step 156. The modified transport layer 116 utilizes the socket parameters, including the sequence number, acknowledgement number, source port number, and destination port number, to create header information for the TCP segment. At step 158, the new TCP segment is then inserted into the TCP stack 114. The TCP segment may be passed directly to the network layer 118 executing the IP protocol or, optionally, additional header information and/or processing may be performed to insert the TCP segment at a lower layer 120 in the stack 114 before the segment is passed to the network layer 118.

If the data received at step 154 is from the network layer 118 or a lower layer 120, a determination as to whether to block the data received is made at step 160. A first determination of whether to block the data is made by the firewall 115. The firewall 115 prevents segments from being passed to the standard transport layer 112 according to the rules previously established. If the rules indicate the data is to be allowed through the firewall, the data is passed to the TCP protocol on the standard transport layer 112 at step 162. If the rules indicate the data is not to be allowed through the firewall, the packet capture module 117 passes a copy of the segment to the modified transport layer 116, capturing all segments that are part of the established TCP connection. At steps 164 and 166, the encapsulated payload within the captured TCP segment is extracted and returned to the tunneling application 108. The tunneling application 108, in turn, passes the payload to the first TCP stack 104 which extracts the data from the end-to-end TCP segment and passes it to the calling application 100.

If a transmission error occurs, the modified transport layer 116 coordinates error correction with the end-to-end TCP connection 102 to prevent TCP meltdown from occurring. Preferably, the congestion control window of the modified transport layer 116 is expanded to a sufficient delay to permit the end-to-end TCP connection 102 to recognize a transmission error and initiate error correction. According to one embodiment, the modified transport layer 116 permits TCP segments to continue to be sent regardless of whether the receiver acknowledges receipt. Thus, the modified transport layer 116 relies on the end-to-end TCP connection 102 to verify proper receipt of all TCP segments.

Thus, the present invention provides a modified transport layer 116 to manage a TCP connection with another device. The modified transport layer 116 recognizes TCP-over-TCP communications and prevents TCP meltdown, reduces the bandwidth requirements, and improves performance. Further, the modified transport layer 116 of the present invention need only be implemented on the sender side of the TCP connection, enabling TCP-over-TCP connections even with devices executing a standard TCP protocol.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A Transmission Control Protocol (TCP) tunnel for transmitting data between a computer and a network, comprising: a modified transport layer configured to execute on the computer, wherein the computer includes a TCP stack having a plurality of protocol layers, one of the plurality of protocol layers is a transport layer, and the modified transport layer executes in parallel with the transport layer; an interface configured to communicate with the modified transport layer and with at least one protocol layer higher than the transport layer, the interface configured to receive a payload from a calling application executing on the at least one protocol layer higher than the transport layer; and a packet capture module configured to execute on the modified transport layer, wherein the modified transport layer is executable to receive the payload from the interface, encapsulate the payload as a TCP segment and insert the TCP segment into the TCP stack on the computer, the packet capture module is configured to receive data from the TCP stack on the computer and to provide the data to the modified transport layer, and the modified transport layer is executable to receive the data from the packet capture module, determine whether a TCP segment is encapsulated in the data, transmit the data to the calling application when a TCP segment is encapsulated in the data, and transmit the data to the transport layer when no TCP segment is encapsulated in the data.

2. The TCP tunnel of claim 1, wherein the payload includes a TCP segment.

3. The TCP tunnel of claim 2, wherein the modified transport layer inserts TCP segments into the TCP stack without receiving data which includes an acknowledgement.

4. The TCP tunnel of claim 1, wherein the modified transport layer periodically passes a stay-alive segment to the transport layer.

5. The TCP tunnel of claim 1, wherein the modified transport layer generates a test message, passes the test message to the TCP stack, and reads a sequence number and an acknowledgement number from a return message captured from the TCP stack.

6. The TCP tunnel of claim 1, wherein the interface establishes a TCP connection, stores an address and a port number corresponding to the TCP connection, and passes the address and the port number to the modified transport layer.

7. The TCP tunnel of claim 1, wherein the modified transport layer can insert the TCP segment into any layer of the TCP stack below the transport layer.

8. The TCP tunnel of claim 1, wherein the modified transport layer includes a firewall for blocking selected TCP segments at least one of from and to the TCP stack.

9. The TCP tunnel of claim 1, wherein the packet capture module captures TCP segments from the TCP stack.

10. The TCP tunnel of claim 1, wherein the modified transport layer selectively bypasses the transport layer and interfaces directly with the network layer.

11. The TCP tunnel of claim 1, wherein the modified transport layer extracts a first TCP sequence number and a first TCP acknowledgment number of an established TCP connection, and computes a second TCP sequence number and a second TCP acknowledgment number corresponding to the first TCP sequence number and the first TCP acknowledgment number respectively.

12. A method of transmitting data between a computer and a network using a Transmission Control Protocol (TCP) tunnel, comprising the steps of: passing connection parameters for a TCP socket from an application executing on the computer to an interface executing on the computer, wherein the computer includes a TCP stack having a plurality of protocol layers, one of the plurality of protocol layers is a transport layer, and the application is executing at a protocol layer higher than the transport layer; initializing a modified transport layer executing on the computer using the connection parameters; obtaining a sequence number and an acknowledgement number for a TCP connection from the connection parameters; accepting an incoming payload from a calling application with the modified transport layer; constructing a TCP segment in the modified transport layer using the payload and the sequence number and the acknowledgment number for the established TCP connection; inserting the TCP segment at or below the transport layer of the TCP stack; receiving data from the TCP stack with the modified transport layer; determining whether a TCP segment is encapsulated in the data, transmitting the data to the application via the modified transport layer when a TCP segment is encapsulated in the data; and transmitting the data to the transport layer when no TCP segment is encapsulated in the data.

13. The method of claim 12, further comprising the steps of:
reading the sequence number and the acknowledgement number from the data; and
computing a next sequence number and a next acknowledgment number corresponding to the sequence number and the acknowledgment number, respectively.

14. The method of claim 12, wherein the TCP socket is one end of an established TCP connection.

15. The method of claim 14, wherein the TCP tunnel obtains the sequence number and the acknowledgement number for the TCP connection by probing the established TCP connection.

16. The method of claim 15, wherein said probing includes:
creating a test segment;
sending the test segment on the TCP connection;
capturing a return segment from the TCP connection; and
reading the sequence number and the acknowledgement number from the return segment.

17. The method of claim 12, wherein the connection parameters include a source Internet Protocol (IP) address, a destination IP address, a source port number, and a destination port number for the TCP Socket.

18. The method of claim 17, wherein the TCP tunnel establishes a TCP connection, and wherein the source IP address, the destination IP address, the source port number, and the destination port number are stored while establishing the TCP connection.

* * * * *